United States Patent [19]

Kimura et al.

[11] Patent Number: 5,539,043
[45] Date of Patent: Jul. 23, 1996

[54] AQUEOUS DISPERSION

[75] Inventors: Itsuo Kimura; Noriyuki Kanetou; Kinichiro Koyama, all of Iwakuni, Japan

[73] Assignee: Nippon Paper Industries Co., Ltd., Tokyo, Japan

[21] Appl. No.: 311,045

[22] Filed: Sep. 23, 1994

[30] Foreign Application Priority Data

Oct. 7, 1993 [JP] Japan .................................. 5-276046

[51] Int. Cl.$^6$ .................................................. C08L 51/00
[52] U.S. Cl. ..................... 524/504; 524/236; 524/247; 524/365; 524/391; 524/401
[58] Field of Search .................................. 524/504, 236, 524/247, 365, 391, 401

[56] References Cited

U.S. PATENT DOCUMENTS 5,227,198  7/1993  Laura et al. .

FOREIGN PATENT DOCUMENTS 1234451  9/1989  Japan .

WO90/12056  10/1990  WIPO .

OTHER PUBLICATIONS

Derwent Abstracts, AN-89-344234/47, JP 1-256549, Oct. 13, 1989.

Derwent Absracts, AN-83-60057K/25, JP 58-080337, May 14, 1983.

*Primary Examiner*—Jeffrey T. Smith
*Attorney, Agent, or Firm*—Oblon, Spivak, McClelland, Maier, & Neustadt

[57] ABSTRACT

Disclosed is an aqueous dispersion comprising a carboxyl group-containing chlorinated polypropylene with acid value of 10 to 60 and chlorine content of 15 to 35 wt. % and a carboxyl group-containing propylene-α-olefin copolymer with number average molecular weight of 2000 to 20000 and acid value of 30 to 150, neutralized with basic substance and dispersed into water using nonionic surfactant. It is possible to obtain an aqueous dispersion of chlorinated polypropylene with excellent adhesive property without using organic solvent.

20 Claims, No Drawings

AQUEOUS DISPERSION

BACKGROUND OF THE INVENTION

The present invention relates to an aqueous dispersion suitable to applications such as primer and paint usable for painting polypropylene-based resin moldings and primer and adhesive for adhering polypropylene-based resin products with other substrates.

Based on excellent properties and low price, polypropylene-based resins are used for household electrical appliances, automobile parts, etc. in large quantities. However, polypropylene-based resins have drawback of difficulty in painting and adhesion because of their nonpolarity. In cases of painting and adhesion onto polypropylene-based resins, therefore, primer having chlorinated polypropylene as a major component is commonly used. However, since the chlorinated polypropylene is used by dissolving it into aromatic organic solvent such as toluene or xylene, large quantities of aromatic organic solvent are forced to be used, arising to problems in aspect of safety, sanitation and environmental pollution.

From this reason, attempts for producing aqueous dispersion of chlorinated polypropylene have been made. Aqueous dispersions of carboxyl group-containing chlorinated polypropylene (Japanese Unexamined Patent Publication No. Hei 1-256549, No. Hei 3-124779 and No. Hei 3-182534), aqueous dispersions of graft-modified chlorinated polypropylene (Japanese Unexamined Patent Publication No. Hei 1-256556, No. Hei 2-284973 and No. Hei 4-88026), mixture with other emulsions (Japanese Unexamined Patent Publication No. Hei 1-153778), use of reactive surfactant (Japanese Patent Application No. Hei 4-258936), and the like are proposed. These methods however employ organic solvent solution of chlorinated polypropylene as a starting material for dispersing into water and had a substantial drawback that large quantities of organic solvent were forced to be used in the process of water dispersion.

On the other hand, proposals for directly making aqueous dispersion from solid chlorinated polypropylene have also been made. Method of making aqueous dispersion through extruder after adding adhesive and poly(vinyl alcohol) to chlorinated polypropylene (Japanese Unexamined Patent Publication No. Sho 58-80337), method of adding ethylene-vinyl acetate copolymer and wax to chlorinated polypropylene followed by dispersing them into water with cationic or anionic acrylic copolymer (Japanese Unexamined Patent Publication No. Sho 58-120655 and No. Sho 59-4637), method of dispersing it into water with amino group-containing acrylic resin (Japanese Unexamined Patent Publication No. Hei 1-223147), and the like were proposed. These methods however had problematic point that many components other than chlorinated polypropylene were added which leads to poor adhesive property or inevitable use of biaxial extruder, then the initial investment thereof is increased. Moreover, a method of dispersing it into water with the aid of polyol (Japanese National Phase Publication No. Hei 4-506530) was proposed, which had a drawback of poor water resistance.

As described above, when making aqueous dispersion of chlorinated polypropylene, there were problematic points of using aromatic organic solvent such as toluene or xylene in large quantities in the production process thereof. This is because of that, since chlorinated polypropylene tends to decompose with dehydrochlorination under heat, it cannot help being dispersed into water at low temperature and hence the dispersion is difficult unless dissolving it into organic solvent. Moreover, the method of directly making aqueous dispersion by adding water in the molten state of solid chlorinated polypropylene had a problematic point that other components such as softener and modifier could not help being added, leading to poor performance.

As a resulting of diligent investigations to solve the problematic points aforementioned, the inventors have found that an aqueous dispersion with excellent adhesive property can be produced without using organic solvent, leading to the invention.

SUMMARY OF THE INVENTION (a) 70 to 98 wt. % of carboxyl group-containing chlorinated polypropylene with acid value of 10 to 60 and chlorine content of 15 to 35 wt. % and (b) 30 to 2 wt. % of carboxyl group-containing propylene-α-olefin copolymer with number average molecular weight of 2000 to 20000 and acid value of 30 to 150 are mixed, molten and kneaded after adding nonionic surfactant and basic substance of 0.4 to 1.5 chemically equivalent to carboxyl group, followed by the addition of water to the kneaded product to form a dispersoid in water.

DETAILED DESCRIPTION OF THE INVENTION

In following, the invention will be illustrated in detail.

The carboxyl group-containing chlorinated polypropylene being (a) component can be obtained by dissolving polypropylene into a solvent being inert to chlorine such as carbon tetrachloride and blowing chlorine gas thereinto for chlorination. The carboxyl group can be introduced by graft-copolymerizing unsaturated carboxylic acid or its anhydride before or after the chlorination.

For polypropylenes as the raw materials, isotactic polypropylene, atactic polypropylene, propylene-α-olefin copolymer, etc. can be used, but, from the point of adhesive property of end product, isotactic polypropylene is preferable. The chlorine content is preferable to be 15 to 35 wt. %. If under 15 wt. %, the melting point and the melt viscosity are too high so that the water dispersion does not proceed well and, if over 35 wt. %, then the adhesive property becomes poor. More preferably it is 18 to 28 wt. %. The acid value of carboxyl group-containing chlorinated polypropylene is preferable to be 10 to 60. If the acid value is under 10, the adhesive property to polar materials is poor and, if the acid value is over 60, then the adhesive property to polypropylene becomes poor.

As unsaturated carboxylic acids or their anhydrides for introducing carboxyl group, acrylic acid, methacrylic acid, maleic acid, maleic anhydride, fumaric acid, itaconic acid, citraconic acid, allylsuccinic acid, mesaconic acid, aconitic acid, etc. can be mentioned. These are added to polypropylene and graft-copolymerized under heat and agitation, using organic peroxide as a catalyst (e.g. Japanese Unexamined Patent Publication No. Sho 59-75958).

The number average molecular weight of carboxyl group-containing chlorinated polypropylene is preferable to be 5000 to 40000. If the number average molecular weight is under 5000, the adhesive property is poor and, if it is over 40000, then the water dispersion goes wrong. Moreover, the melting point is preferable to be not higher than 120° C. and, if higher than 120° C., the water dispersion goes wrong.

The carboxyl group-containing propylene-α-olefin copolymer being (b) component is one in which carboxyl group is introduced by graft-copolymerizing unsaturated carboxylic acid or its anhydride onto propylene-α-olefin copolymer.

The propylene-α-olefin copolymer is produced through the random copolymerization or block copolymerization of propylene with α-olefin and the random copolymer is more preferable than the block copolymer. As α-olefins, ethylene, butene-1, pentene-1, hexene-1, etc. are mentioned and two or more kinds of these may be used for copolymerization. Among these, ethylene or 1-butene is preferable from the point of physical properties of resin. Moreover, the proportion of propylene component is preferable to be not less than 55 mol %.

The graft copolymerization of unsaturated carboxylic acid or its anhydride for introducing carboxyl group can be performed by graft-copolymerizing acrylic acid, methacrylic acid, maleic acid, maleic anhydride, fumaric acid, itaconic acid, citraconic acid, allylsuccinic acid, mesaconic acid, aconitic acid, etc. being similar as described under the item of (a) component above, using organic peroxide as a catalyst by the similar method.

The acid value of carboxyl group-containing propylene-α- olefin copolymer is preferable to be 30 to 150. If under 30, the water dispersion is difficult and, if over 150, then the water resistance becomes poor when making the end product as a film. Moreover, the number average molecular weight is preferable. to be 2000 to 20000. If under 2000, the adhesive property of aqueous dispersion is poor and, if over 20000, then the water dispersion goes wrong.

The amounts of (a) component and (b) component are preferable to be 70 to 98 wt. % of (a) component and 30 to 2 wt. % of (b) component. If the amount of (b) component is more than 30 wt. %, the compatibility between (a) component and (b) component becomes poor, resulting in poor stability when making up the aqueous dispersion. If the amount of (b) component is less than 2 wt. %, then the water dispersion becomes difficult.

As the nonionic surfactants, polyoxyethylene alkyl ester, polyoxyethylene alkyl ether, polyoxyethylene alkylphenol ether, sorbitan alkyl ester, polyglycerine ester, pluronic types, etc. can be exemplified. For the nonionic surfactants, two kinds with different HLBs may be used by mixing. Moreover, small amount of anionic surfactant may be used in combination with major portion of nonionic surfactant.

The reason for adding basic substance is to neutralize and ionize the carboxyl group for good dispersion into water. If adding no basic substance, stable dispersion will not be obtained. As the bases, sodium hydroxide, potassium hydroxide, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino- 2-methyl-1-propanol, 2-amino-2-methyl-1-propanol, morpholine, etc. can be exemplified.

These have to be selected appropriately depending on the conditions, but amines with hydroxyl group such as ethanolamine and 2-amino-2-methyl-1-propanol are preferable. The amount of base to be used is suitable to be within a range from 0.4 to 1.5 times the chemical equivalence to carboxyl group and preferable are 0.5 to 1.2 times. If under 0.4 times, it is impossible to produce the dispersion with good stability.

In the invention, the method of obtaining aqueous dispersion is as follows: To carboxyl group-containing chlorinated polypropylene being (a) component, carboxyl group-containing propylene-α-olefin copolymer being (b) component is added, and the mixture is molten at about 120° C. After adding nonionic surfactant and basic substance of 0.4 to 1.5 chemically equivalent to carboxyl group thereto, the mixture is molten and kneaded, water of 80° to 98° C. is added in the molten state to form a W/O type dispersoid, successively this is subject to the phase inversion to O/W type dispersoid, and additional amount of water is added, if need be, thereby producing the aqueous dispersion.

As water is added, the viscosity of system rises suddenly, but, as further water is added, the phase inversion takes place to reduce the viscosity, thus giving an aqueous dispersion capable of diluting arbitrarily with water. The heating temperature is higher than melting point and preferable to be 90° to 120° C. If raising to over 120° C., chlorinated polypropylene will tend to be subject to dehydrochlorination with violent decomposition, resulting in brown discoloring and corrosion of equipment, which is unpreferable.

For the reaction equipment, it is only necessary to use a reaction vessel equipped with agitator and jacket. Though intense agitation is more desirable, even if not so, the production of aqueous dispersion may be possible. Moreover, upon dispersing into water, the stabilizers such as epoxy compound may be added.

The inventive dispersion dispersed into water in this way is excellent in the adhesion to polyolefinic resins, in particular, to polypropylene and, since it has also the adhesive property to polar substrates, it is excellent in the uses for primer, paint and adhesive on painting and adhesion. Moreover, the particle diameter is small and the stability is good. The inventive aqueous dispersion may be used as it is or after mixing with pigment, or after blending with other aqueous resin components. Various additives may be added, or small amount of water-soluble organic solvents may be added to aid the evaporation of water and enhance the drying property. It can be coated onto the substrate resin by roll coating, spraying, brushing or the like.

Because of the instability of chlorinated polypropylene to heat, it could not be dispersed into water without the aid of organic solvent. In the invention, however, it has been found that, if using carboxyl group-containing propylene-α-olefin copolymer, the thermal decomposition of chlorinated polypropylene is inhibited, thus allowing to obtain the aqueous dispersion without organic solvent. In addition, carboxyl group-containing propylene-α-olefin copolymer has the adhesive property to polypropylene, hence the adhesive property of chlorinated polypropylene is not decreased by the addition of said component.

In following, the invention will be illustrated concretely based on the examples, but the invention is not confined to these.

Production Example 1

In a three-neck flask equipped with agitator, dropping funnel and cooling pipe for refluxing monomer were placed 500 g of isotactic polypropylene with number average molecular weight of 30000, which was molten completely in an oil bath kept constant at 180° C. After substituted the inside of flask for about 10 minutes with nitrogen, 20 g of maleic anhydride were added therein over about 5 minutes while agitating, and then a solution dissolving 2 g of di-t-butyl peroxide into 10 ml of heptane was added therein over about 30 minutes from dropping funnel. At this time, the inside of system was kept at 180° C. After the reaction is further confirmed for about 1 hour, unreacted maleic anhydride was removed over about 30 minute while reducing the pressure in flask through aspirator. Then, about 300 g of this product were added in a glass-lined reactor and 5 liters of carbon tetrachloride were added. After dissolving them enough at 110° C. under pressure of 2 kg/cm, gaseous chlorine was blown into the solution from the bottom of reactor until the chlorine content reaches 24 wt. % while irradiating ultraviolet rays. After completion of reaction, the resultant product was passed through an extruder and carbon tetrachloride being solvent was removed under reduced pressure to obtain carboxyl group-containing chlorinated polypropylene in the form of solid pellet. The acid value thereof was 26, the melting point was 90° C. and the number average molecular weight was 28000.

Production Example 2

In a four-neck flask equipped with agitator, cooling pipe and dropping funnel were molten 500 g of propylene-butene-ethylene terpolymer (propylene component 68 mol %) under heat and, while keeping the temperature of system at 180° C. and agitating, 49 g of maleic anhydride and 8 g of dicumyl peroxide were added dropwise over 3 hours, respectively. Then, after reacting for 3 hours, unreacted maleic anhydride was removed over about 30 minutes while reducing the pressure in flask through aspirator. The product obtained had an acid value of 75, a melting point of 95° C. and a number average molecular weight of 12000.

EXAMPLE 1

Into a flask with agitator were put 80 g of carboxyl group-containing chlorinated polypropylene of Production example 1 and 20 g of carboxyl group-containing propylene-α-olefin copolymer of Production example 2, and the mixture was molten by heating to 120° C. After adding 10 g of nonionic surfactant Nonion NS-212 (from Nippon Oil and Fats Co.), the mixture was agitated well and 3 g of ethanolamine (chemical equivalence 0.7) were added. While keeping the temperature at 100° C. and agitating intensively, water of 90° C. was added little by little. The viscosity increased, but, continuing the addition of water as it is, the viscosity decreased. At the point when 150 g of water were added, the content was taken out. The content was milky white fluid.

EXAMPLE 2

Into a flask with agitator were put 95 g of carboxyl group-containing chlorinated polypropylene of Production example 1 and 5 g of carboxyl group-containing propylene-α-olefin copolymer of Production example 2, and the mixture was molten by heating to 120° C. After added 15 g of nonionic surfactant Nonion NS-212 (from Nippon Oil and Fats Co.), the mixture was agitated well and 3 g of morpholine (chemical equivalence 0.7) were added. While keeping the temperature at 100° C. and agitating intensively, water of 90° C was added little by little. The viscosity increased, but, continuing the addition of water as it is, the viscosity decreased. At the point when 150 g of water were added, the content was taken out. The content was a milky white fluid.

Comparative Example 1

Into a flask with agitator were put 100 g of carboxyl group-containing chlorinated polypropylene of Production example 1, and this was molten by heating to 120° C. After added 10 g of non ionic surfactant Nonion NS-212 (from Nippon Oil and Fats Co.), the mixture was agitated well and 2 g of ethanolamine (chemical equivalence 0.7) were added. While keeping the temperature at 100° C. and agitating intensively, water of 90° C. was added little by little. The viscosity increased and the addition of water was continued as it is, but the dispersion was not formed, and resin and water were separated each other.

Comparative Example 2

Into a flask with agitator were put 80 g of carboxyl group-containing chlorinated polypropylene of Production example 1 and 20 g of acid modified polyethylene wax with melting point of 100° C., and the mixture was molten by heating to 120° C. After adding 15 g of nonionic surfactant Nonion NS-212 (from Nippon Oil and Fats Co.), the mixture was agitated well and 2 g of ethanolamine (chemical equivalence 0.7) were added. While keeping the temperature at 100° C. and agitating intensively, water of 90° C. was added little by little. The viscosity increased, but, continuing the addition of water as it is, the viscosity decreased. At the point when 150 g of water were added, the content was taken out. The content was a milky white fluid, but, when allowed to stand, precipitation was formed.

Comparative Example 3

Into a flask with agitator were put 100 g of carboxyl group-containing chlorinated polypropylene of Production example 1 and 20 g of toluene, and the mixture was molten by heating to 120° C. After added 20 g of nonionic surfactant Nonion NS-212 (from Nippon Oil and Fats Co.), the mixture was agitated well and 2 g of ethanolamine (chemical equivalence 0.7) were added. While keeping the temperature at 100° C. and agitating intensively, water of 90° C. was added little by little. The viscosity increased, but, continuing the addition of water as it is, the viscosity decreased. At the point when 150 g of water were added, the content was taken out. The content was a milky white fluid, but had a lot of large lumps.

Test Example

Fluids after filtering the aqueous dispersions of Examples 1 and 2 and the aqueous dispersions of Comparative examples 2 and 3 were each spray-coated onto a plate of polypropylene resin and dried for 15 minutes at 80° C. Following this, two-component urethane-based upper-coating paint was coated and, after allowed to stand for 10 minutes at room temperature, it was dried forcedly for 30 minutes at 80° C. by using a hot-air dryer. After allowed the painted plate obtained to stand for 1 day at room temperature, tests of painted film were conducted. Results are shown in Table 1.

TABLE 1

| Composition | Adhesive property | Gasoline resistance | Water resistance |
|---|---|---|---|
| Example 1 | 100/100 | Good | Good |
| Example 2 | 100/100 | Good | Good |
| Comparative example 2 | 20/100 | Stripping | Stripping |
| Comparative example 3 | 80/100 | Stripping | Small blisters |

Besides, the test methods are as follows:

Adhesive property

Incisions reaching the base were scored on the surface of painted film by a cutter to prepare 100 cross-cuts at intervals of 1 mm. Cellophane adhesive tape was closely adhered thereon and peeled off in the direction of 180 degrees to count the number of remaining cross-cuts.

Gasoline resistance

Incisions reaching the base were scored on the surface of painted film and, after dipping into regular gasoline for 2 hours, the state of painted film was observed visually.

Water resistance

After dipping into warm water of 50° C. for 10 days, the state of painted film was observed visually.

Whereas the aqueous dispersion could not be produced in Comparative example 1, it was produced in Example 1 or 2, clearly showing the effect of the invention. In Comparative example 2, if neglecting the precipitation, the aqueous dispersion could be produced, but the adhesive property is poor, as seen from Table 1. In Comparative example 3, organic solvent is used and yet the lumps are caused. In this way, in accordance with the invention, the aqueous dispersion with excellent adhesive property can be made without using organic solvent.

What is claimed is:

1. An aqueous dispersion comprising,
   (a) 70 to 98 wt. % of carboxyl group-containing chlorinated polypropylene with acid value of 10 to 60 and chlorine content of 15 to 35 wt. % and
   (b) 30 to 2 wt. % of carboxyl group-containing propylene-α-olefin copolymer with number average molecular weight of 2000 to 20000 and acid value of 30 to 150, neutralized with basic substance and dispersed into water using nonionic surfactant.

2. The aqueous dispersion of claim 1, wherein the melting point of carboxyl group-containing chlorinated polypropylene is not higher than 120° C. and the number average molecular weight is 5000 to 40000.

3. A method for producing an aqueous dispersion comprising the steps of mixing
   (a) 70 to 98 wt. % of carboxyl group-containing chlorinated polypropylene with acid value of 10 to 60 and chlorine content of 15 to 35 wt. % and
   (b) 30 to 2 wt. % of carboxyl group-containing propylene-α-olefin copolymer with number average molecular weight of 2000 to 20000 and acid value of 30 to 150, melting and kneading after adding nonionic surfactant and basic substance of 0.4 to 1.5 chemically equivalent to carboxyl group, followed by addition of water to the kneaded product to form a dispersoid in water.

4. The method for producing an aqueous dispersion of claim 3, wherein the melting point of carboxyl group-containing chlorinated polypropylene is not higher than 120° C. and the number average molecular weight is 5000 to 40000.

5. The aqueous dispersion of claim 1, wherein said carboxyl group-containing chlorinated polypropylene comprises isotactic polypropylene.

6. The aqueous dispersion of claim 1, wherein said carboxyl group-containing chlorinated polypropylene has a chlorine content of 18 to 28 wt %.

7. The aqueous dispersion of claim 1, wherein the α-olefin of said carboxyl group-containing propylene-α-olefin copolymer is ethylene, 1-butene, 1-pentene, 1-hexene or a mixture thereof.

8. The aqueous dispersion of claim 7, wherein said α-olefin is ethylene, 1-butene or a mixture thereof.

9. The aqueous dispersion of claim 1, wherein said carboxyl group-containing propylene-α-olefin copolymer comprises not less than 55 mol % propylene.

10. The aqueous dispersion of claim 1, wherein said nonionic surfactant is selected from the group consisting of polyoxyethylene alkyl esters, polyoxyethylene alkyl ethers, polyoxyethylene alkylphenol ethers, sorbitan alkyl esters, polyglycerine esters, pluronic surfactants and mixtures thereof.

11. The aqueous dispersion of claim 1, wherein said basic substance is selected from the group consisting of sodium hydroxide, potassium hydroxide, ammonia, methylamine, ethylamine, propylamine, butylamine, hexylamine, octylamine, ethanolamine, propanolamine, diethanolamine, N-methyl diethanolamine, dimethylamine, diethylamine, triethylamine, N,N-dimethylethanolamine, 2-dimethylamino-2-methyl-1-propanol, 2-amino-2-methyl-1-propanol and morpholine.

12. The aqueous dispersion of claim 1, wherein said carboxyl group-containing chlorinated polypropylene and said carboxyl group-containing propylene-α-olefin copolymer are neutralized with 0.4 to 1.5 equivalents of said basic substance.

13. The aqueous dispersion of claim 1, wherein said aqueous dispersion is an oil-in-water dispersoid.

14. The method for producing an aqueous dispersion of claim 1, wherein said carboxyl group-containing chlorinated polypropylene comprises isotactic polypropylene.

15. The method for producing an aqueous dispersion of claim 1, wherein said carboxyl group-containing chlorinated polypropylene has a chlorine content of 18 to 28 wt %.

16. The method for producing an aqueous dispersion of claim 1, wherein the α-olefin of said carboxyl group-containing propylene-α-olefin copolymer is ethylene, 1-butene, 1-pentene, 1-hexene or a mixture thereof.

17. The method for producing an aqueous dispersion of claim 16, wherein said α-olefin is ethylene, 1-butene or a mixture thereof.

18. The method for producing an aqueous dispersion of claim 1, wherein said carboxyl group-containing propylene-α-olefin copolymer comprises not less than 55 mol % propylene.

19. The method for producing an aqueous dispersion of claim 1, wherein said nonionic surfactant is selected from a group consisting of polyoxyethylene alkyl esters, polyoxyethylene alkyl ethers, polyoxyethylene alkyl phenol ethers, sorbitan alkyl esters, polyglycerine esters, pluronic surfactants and mixtures thereof.

20. The method for producing an aqueous dispersion of claim 1, wherein said basic substance is selected from a group consisting of sodium hydroxide, potassium hydroxide, ammonia, methylamine, ethylamine, propylamine, butylamine, hexylamine, octylamine, ethanolamine, propanolamine, N-methyl diethanolamine, diethanolamine, dimethylamine, diethylamine, triethylamine, N,N-diethanolamine, 2-dimethylamino-2-methyl-1-propanol, 2-amino-2-methyl-1-propanol and morpholine.

* * * * *